United States Patent [19]

Jarvis et al.

[11] Patent Number: 5,875,863
[45] Date of Patent: *Mar. 2, 1999

[54] POWER SYSTEM FOR EXTENDING THE EFFECTIVE RANGE OF HYBRID ELECTRIC VEHICLES

[75] Inventors: Hyrum T. Jarvis, 10033 E. Kratt La., Whittier, Calif. 90601; Conrad Hulme, Whittier, Calif.

[73] Assignee: Hyrum T. Jarvis, Whittier, Calif.

[ * ] Notice: The term of this patent shall not extend beyond the expiration date of Pat. No. 5,782,084.

[21] Appl. No.: 620,268

[22] Filed: Mar. 22, 1996

[51] Int. Cl.$^6$ .................................................. B60K 11/04
[52] U.S. Cl. ............................................ 180/65.4; 60/518
[58] Field of Search ................................. 180/65.1, 65.2, 180/65.3, 65.4; 60/517, 518

[56] References Cited

U.S. PATENT DOCUMENTS

| | | | |
|---|---|---|---|
| 3,319,416 | 5/1967 | Renshaw | 60/525 |
| 3,503,464 | 3/1970 | Yardney | 180/65.2 |
| 3,515,968 | 6/1970 | Crawford | 180/65.4 X |
| 3,732,690 | 5/1973 | Meijer | 60/517 X |
| 3,852,961 | 12/1974 | Salomonsson et al. | 60/517 |
| 3,965,976 | 6/1976 | Barton | 60/517 X |
| 4,195,482 | 4/1980 | Moloney | 60/517 |
| 5,214,358 | 5/1993 | Marshall | 180/65.4 X |
| 5,255,733 | 10/1993 | King | 180/65.3 X |
| 5,323,868 | 6/1994 | Kawashima | 180/65.4 |
| 5,385,211 | 1/1995 | Carroll | 180/65.2 |
| 5,495,907 | 3/1996 | Data | 180/65.2 |
| 5,515,937 | 5/1996 | Adler et al. | 180/65.4 X |
| 5,566,774 | 10/1996 | Yoshida | 180/65.4 |

OTHER PUBLICATIONS

"Amazing Hot–Gas Engine" Popular Science, Jun. 1971, pp. 54–56.

Primary Examiner—Brian L. Johnson
Assistant Examiner—Michael Mar
Attorney, Agent, or Firm—Lyon & Lyon LLP

[57] ABSTRACT

The power system for extending the effective range of an electrical vehicle including a non-polluting power generating mechanism for recharging the battery system during vehicle use and providing sufficient electrical energy to an electric motor for constant speed cruising without draining the battery system. The additional power needed for acceleration and hill climbing is provided by a temporary draw on the battery system, and by an increase in the RPM of the heat engine when needed. When the need for additional power is over, the power generating mechanism again recharges the battery system while it provides the energy necessary for continued steady state operation. The power generating mechanism comprises a non-polluting heat engine which is mechanically coupled to an alternator or a generator and a control network for controlling the heat engine and selectively directing the electrical energy generated by the heat engine to the vehicle's electric motor and/or battery supply.

6 Claims, 16 Drawing Sheets

0 DEGREES

30 DEGREES

60 DEGREES

90 DEGREES

120 DEGREES

150 DEGREES

180 DEGREES

210 DEGREES

240 DEGREES

270 DEGREES

300 DEGREES

330 DEGREES

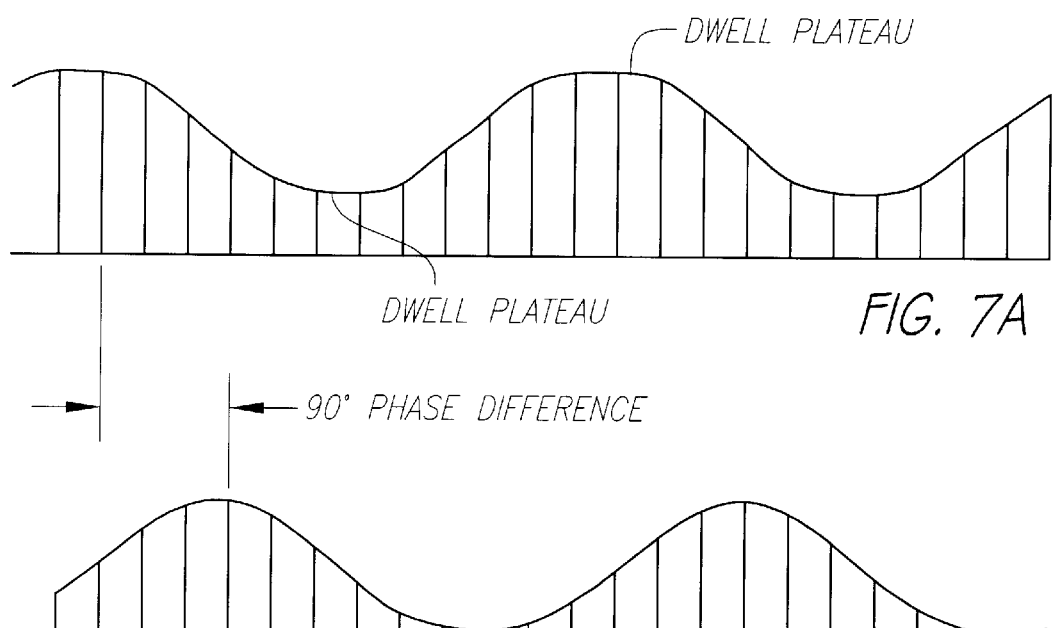

POWER SYSTEM FOR EXTENDING THE EFFECTIVE RANGE OF HYBRID ELECTRIC VEHICLES

BACKGROUND OF THE INVENTION

Numerous efforts have been undertaken to develop a pollution-free electrically-powered vehicle as an alternative to vehicles powered by internal combustion engines. The primary limitation to the implementation of battery power as an alternative to the internal combustion engine has been the limited amount of energy that can be stored in a battery system of acceptable size and weight; As a result of this limited energy storage capacity and the failure of the industry to develop a suitable charging system, the electric vehicles currently available or proposed have a range of only about sixty to eighty miles before recharging and thus have limited utility.

Another shortcoming of electric vehicles related to the problem of limited range is the need for lengthy, stationary battery recharging. This need not only requires downtime for the vehicle, but consumes energy derived from traditional sources, thus undermining the zero-emissions objective of the electric vehicle concept. While electrically powered vehicles would eliminate the consumption of fossil fuel during use, the generation of the power necessary to recharge the vehicle's batteries requires fossil fuel consumption. Thus, pollution is shifted from a moveable source to a fixed source. While emissions from such a stationary source may be easier to control than those generated by automobiles powered by internal combustion engines, they would still prevent the zero-emissions concept of electric car usage from being fully attained.

Thus, to realize fully many of the potential benefits of electrically powered vehicles, it is first necessary to provide a mechanism for extending the effective range of the vehicle. It is also important that an increase in range be achieved without significantly increasing the overall vehicle weight and thus decreasing performance. Moreover, it has been recognized that there is a definite need to reduce the downtime for re-charging, much less the energy costs attendant to recharging. Without these advances, widespread acceptance of such vehicles is unlikely. Even with these advances, however, it is also important that the mechanism for extending the vehicle's range be non-polluting. In this regard, the mechanism should obviate the need for stationary battery recharging and preferably give off zero emissions. The power system of the present invention obtains these results.

SUMMARY OF THE INVENTION

The power system of the present invention extends the effective range of an electric vehicle by providing an on-board, zero emissions, power generating mechanism for recharging the battery system during vehicle use and providing sufficient electrical energy to the motor for steady state or constant velocity cruising without draining the battery system. The additional power needed for acceleration and hill climbing is provided by a temporary draw from the battery system. When the need for additional power is over, the power generating mechanism again recharges the battery system while it provides the energy necessary for continued steady state operation.

The on-board power generating mechanism of the present invention comprises a zero-emissions or non-polluting heat engine, preferably a modified Stirling engine which is mechanically coupled to an alternator or generator. The alternator or generator electrically communicates, via a control network, with the vehicle's battery supply and with the electric drive motor to provide drive current for the vehicle's electric motor and/or selectively charge the vehicle's on-board batteries. The heat engine can be powered by a variety of non-polluting heat sources, in a preferred embodiment, the catalytic conversion of molecular hydrogen. As a result of the present invention, not only is the range of the vehicle substantially increased, a significant reduction in battery weight is attainable, thereby effecting greater acceleration, easier braking, shorter braking distance and greater payload capacity.

BRIEF DESCRIPTION OF THE DRAWINGS

FIG. 7 is a simplified view of a drive system employed in the present invention.

DESCRIPTION OF THE PREFERRED EMBODIMENTS

Figure 1:
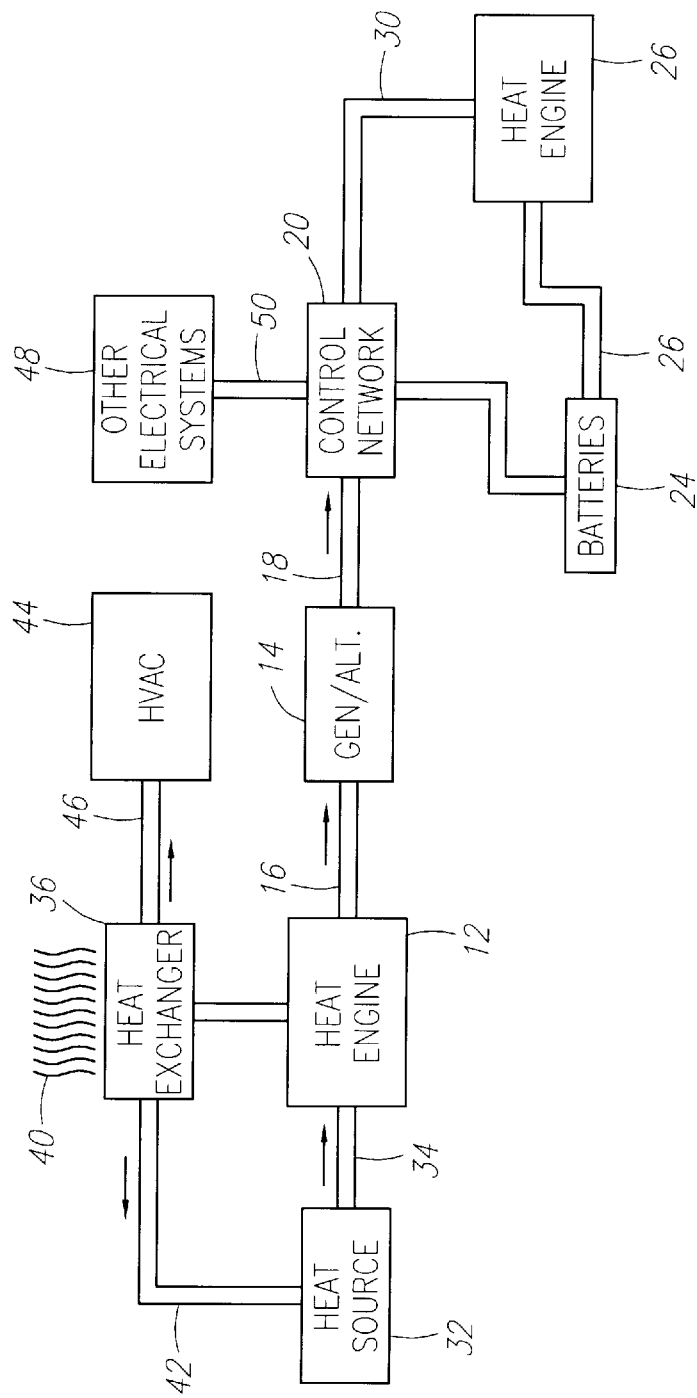
FIG. 1 is a schematic diagram of a power system of the present invention.

The system 10 of the present invention preferably includes a heat engine 12 which is mechanically coupled to an electric power generating device 14, such as an alternator or generator (hereinafter referred to as a generator), through a suitable linkage 16 such as a rotating shaft or the like. The generator 14 produces electric current which is transmitted over line 18 to a programmed control network 20. Control network 20 selectively routes the generated current over line 22 to charge batteries 24 which are in electrical communication with vehicle's electric drive motor 26 via line 28. Alternatively, the electric current generated by the heat engine 12 and generator 14 may be transmitted by the control network 20 directly to motor 26 via line 30. The control network 20 is also programmed to transmit the generated electric current simultaneously to both the batteries 24 and motor 26 when desired. A heat source 32 is provided to power the heat engine 12 and is mechanically connected to engine 12 via conduit 34. A heat exchanger 36 communicates with heat engine 12 through conduit 38 to withdraw heat from engine 12. This heat can be radiated to the atmosphere as indicated at 40, redirected to heat source 32 via line 42, and/or directed to a heating, ventilating and air conditioning system 44 via line 46 to heat and/or cool the interior of the vehicle. Control network 20 can also be electrically coupled to other electrical systems 48 in the vehicle via line 50 for use as desired.

In the preferred embodiment of the invention, a highly efficient, non-polluting modified Stirling engine is employed in system 10 as the heat engine Will be described later herein and 12. Such an engine is disclosed in applicant's co-pending application, Ser. No. 08/481,798, filed Jun. 7, 1995, the teachings of which are hereby incorporated by reference as though fully set forth herein. A modified Cannot engine might also be employed as the heat engine 12. While a variety of heat sources 32 might be used to power heat engine 12, catalytic conversion of molecular hydrogen is preferred due to the ready availability of hydrogen and the fact that its catalytic conversion would not generate significant amounts of pollutants into the atmosphere. The technology of the use of molecular hydrogen and the relative safety of its use as a power source is more completely explained in "*THE HYDROGEN WORLD FORCE*" by Roger E. Billings, American Academy of Science, 1991. Other external combustion heat sources could, of course, be employed or even a non-combustion thermal source such as fission or fusion. The electric drive motor 26 can be of any conventional design suitable for driving the vehicle at acceptable rates of speed and providing adequate acceleration.

Control network 20 is programmed such that the electrical energy developed by heat engine 12 and generator 14 is selectively directed to batteries 24 and/or drive motor 26 such that during steady state or relatively constant speed cruising the electric energy powering motor 26 is generally provided solely by the heat engine 12 and generator 14. During such operation, the control network 20 will periodically direct a portion of such energy to the batteries 24 to effect on-board recharging of the battery system as needed during usage. The constant velocity modified Stirling engine discussed earlier herein is ideally suited for this purpose. While the Stirling engine does change speed, it does so slowly, such that it is not suitable to respond to the rapid speed variations of which the internal combustion engine is capable, so as to provide rapid acceleration, etc. Control network 20 will selectively vary the speed of engine 12 as power requirements of the system dictate. For example, as additional power is needed for acceleration and hill climbing, controller 20 calls for a temporary drain from the battery system. This is achieved by the control network 20 which directs energy from batteries 24 to motor 26 in response to the demand from having depressed the accelerator, for example. Where there remains a demand for an increased amount of power, controller 20 will command the engine to increase it speed, not only to maintain higher output to the drive motor 26, but to also sustain battery charging. When the temporary battery drain ceases, the batteries will continue to be recharged by means of the heat engine and electric generator, via the control network. As battery charge reaches a desired level, controller 20, can signal a reduction in heat engine speed. When the vehicle is parked, the heat engine may be required to continue running until full battery charge is attained, whereupon the control network 20 would shut the engine down. Stirling-type engines are well known for their quiet operation, and being non-polluting, would pose little difficulty if parked in a closed garage.

As a result of system 10, the range of the electric vehicle is substantially increased without compromising the zero-emissions benefits sought to be obtained from electrically powered vehicles and without a corresponding increase in battery weight which would otherwise degrade the vehicle's performance. With the on-board charging/power capability, the system virtually eliminates the down-time necessary to recharge conventional electric powered vehicles. In addition, the system 10 allows for the use of dynamic braking which can increase the range of the vehicle because the back EMF generated thereby can be routed by the control network 20 to further charge the batteries.

Figure 2:
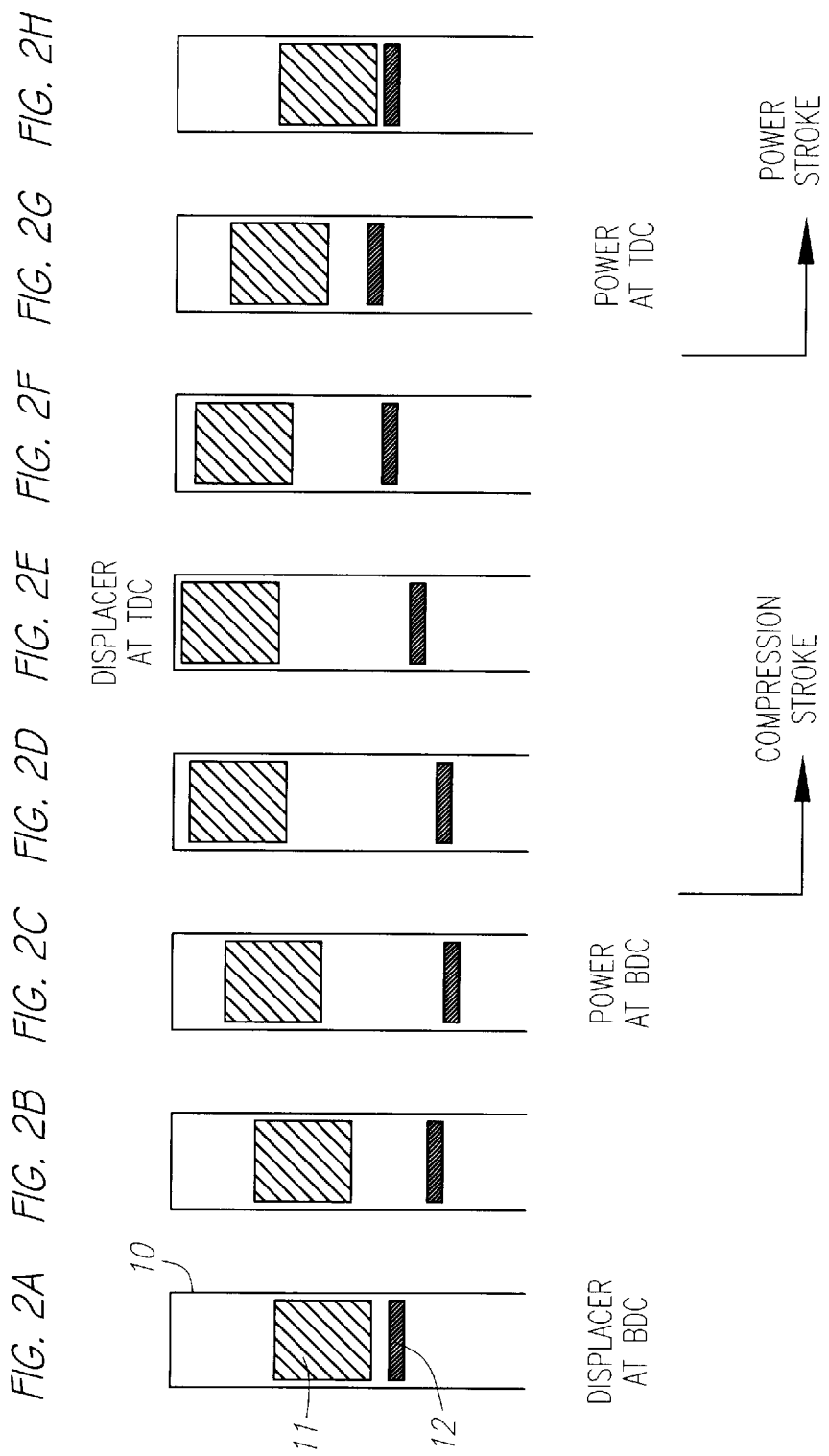
FIGS. 2a through 2h comprise a chart showing the relative locations of the displacer and power pistons in a Beta configured Stirling engine in which the displacer piston is 90 degrees in phase ahead of the power piston.
Figure 3:
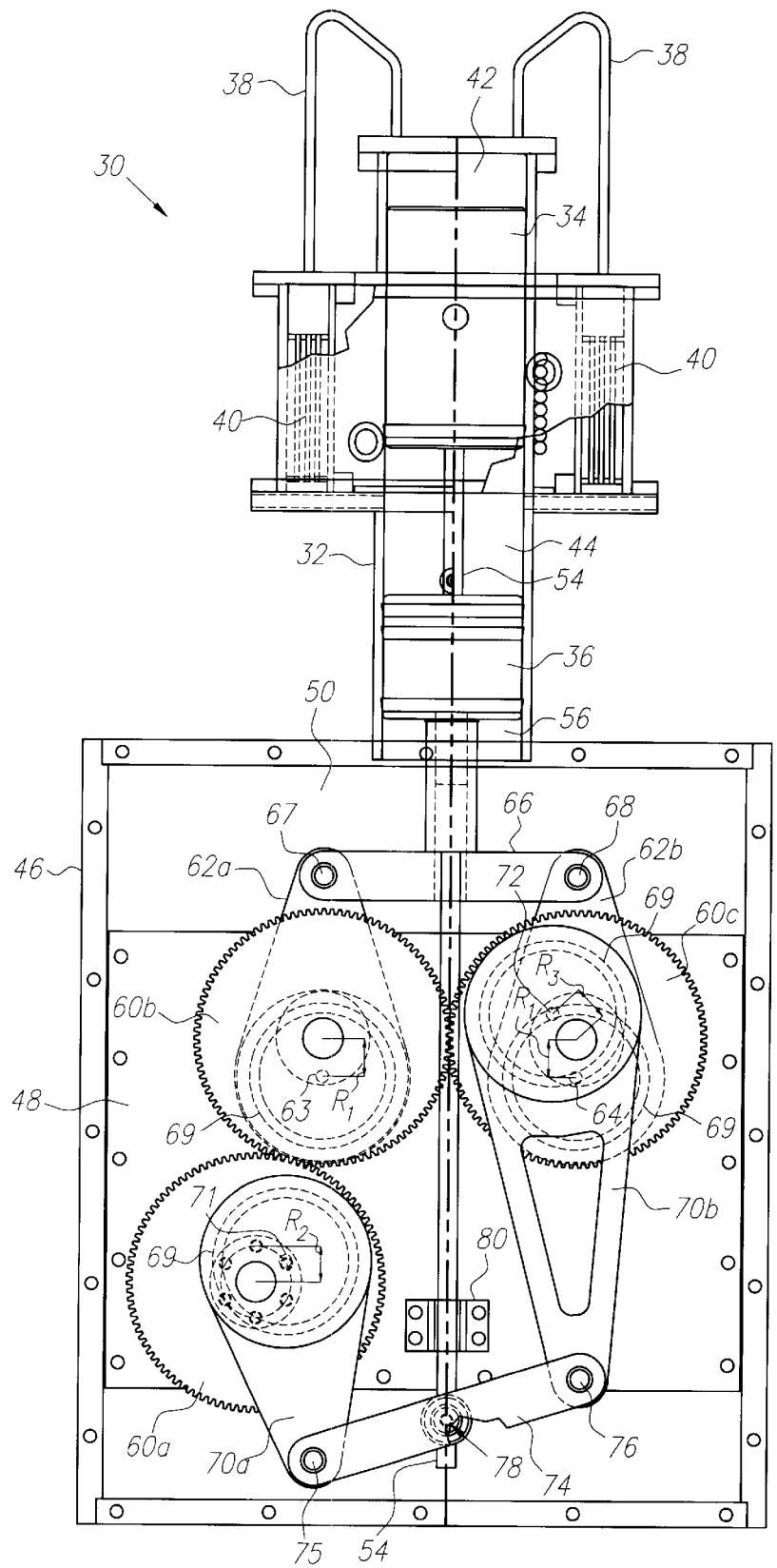
FIG. 3 is a right side view of a drive system employed in the present invention.
Figure 4:
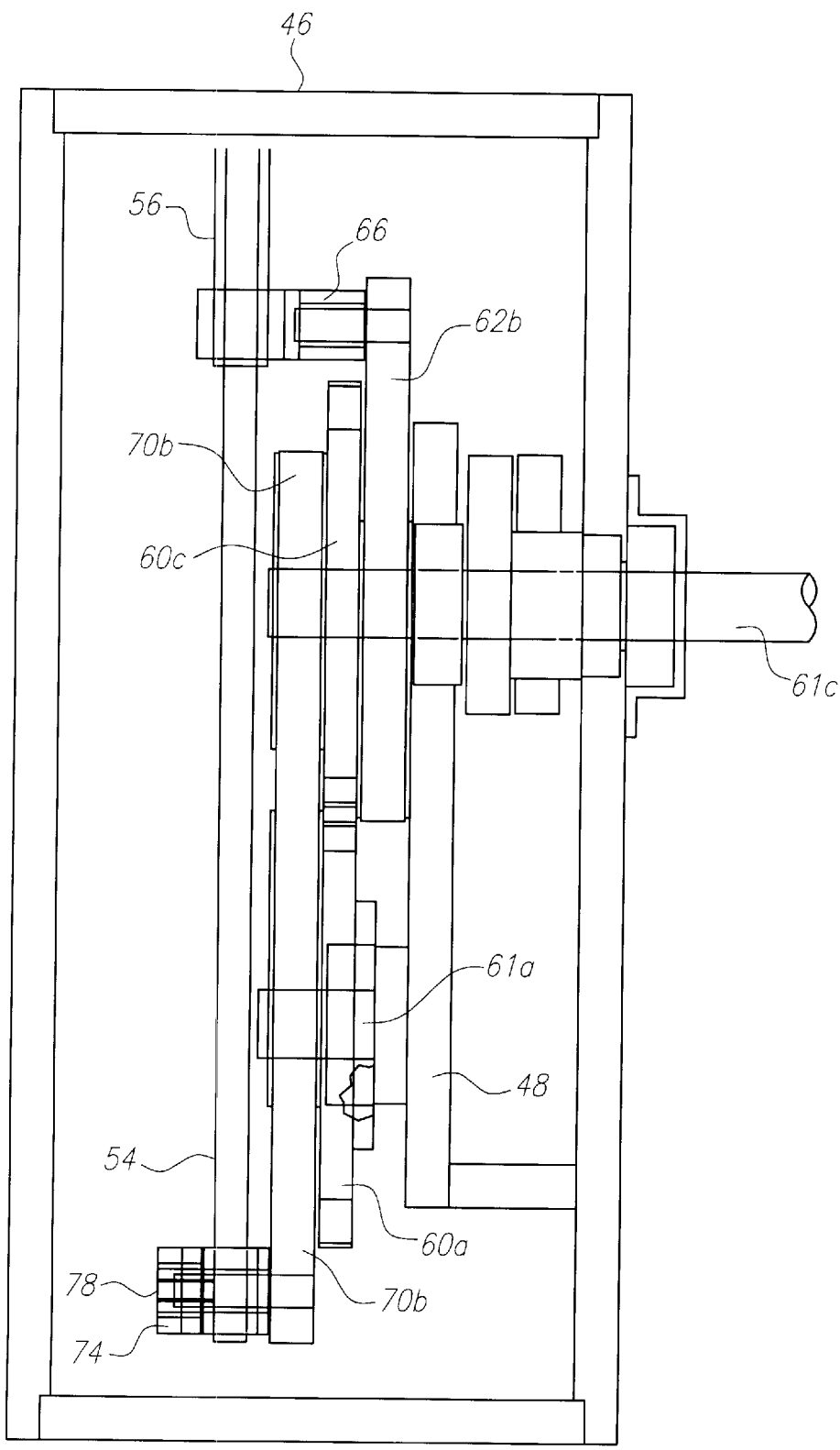
FIG. 4 is a left side view of a drive system employed in the present invention.

Referring now to FIGS. 2–4, an embodiment of the current invention is shown in connection with a Beta configured Stirling engine. As discussed later, the current invention is also suitable for use in Gamma and Alpha Stirling engine configurations. FIG. 2 is a front view and FIGS. 3 and 4 are right and left side views respectively.

As shown in FIG. 2, Stirling engine 130 includes cylinder 132 in which displacer piston 134 and power piston 136 reciprocate. In FIG. 2, cylinder 132 has been sectioned away to expose the components contained therein. Control loops 138, which include heat exchanger/coolers 140, serve to alternatingly pass the working fluid or gas between hot (expansion) space 142 and cold (compression) space 144. In FIG. 2, regenerators 140 have also been partially sectioned away.

Cylinder 132 may be mounted to frame 146 which may house drive system 150. Frame 146 may include mounting plate 148 to which various of the components discussed below are attached. Mounting plate 148 may be coupled to frame 146 by bolts, brackets or the like. Displacer piston shaft 154 is attached to displacer piston 134. Power piston shaft 156 is attached to power piston 136. Displacer piston shaft 154 extends through power piston 136 and power piston shaft 156. A suitable seal (not shown) is interposed between displacer shaft 154, and power piston 136 and power piston shaft 156 to prevent leakage of the working fluid or gas.

As discussed above, the displacer piston in existing Stirling engines remains at its bottom dead center position during the power stroke only for an instant. The preferred drive system 150 of the current invention however, provides that displacer piston 134 may be held at its bottom dead center position during the power stroke and at its top dead center position during the compression stroke for increased time intervals. As discussed later, this dwell is essentially achieved by controlling the motion of displacer piston 134 so that it moves in a complex sinusoidal function, i.e., the sum of several sinusoids.

The dwell at the displacer piston's bottom dead center position provides an increase in the work and power output of the Stirling engine 130. This is because more of the force provided by the hot expanding gas as it enters cold space 144 is exerted against power piston 136 instead of being "consumed" or received by the increasing volume of cold space 144 that had been occupied by displacer piston 134 immediately prior. As discussed later, the total amount of dwell per cycle occurring at the top and bottom dead center positions cumulatively, as well as the amount of dwell occurring at each of the top and bottom dead center positions, may be adjusted. The components of drive assembly 150 which provide this dwell feature are now described.

Drive assembly 150 may include primary motion gears 160a, 160b and 160c each having teeth which are intermeshed as shown. Alternatively, any type of rotating elements that may interact with each other may be used. Through the various components as described herein, gear 160a may be coupled to displacer piston shaft 154, gear 160b may be coupled to power piston shaft 156 and gear 160c may be coupled to both displacer piston shaft 154 and power piston shaft 156. As more clearly shown in FIGS. 3 and 4, gears 160a,b may be connected to mounting plate 148 by shafts 161a,b respectively. Gear 160c may be connected to mounting plate 148 by shaft 161c which itself may also serve as the power output shaft of Stirling engine 130.

As shown, gears 160a,c rotate in a clockwise direction while gear 160b rotates counterclockwise. For simplicity of design, it is preferred that all three gears 160a,b,c have the same diameter which is a function of intended end use load. It is preferred that the centers of gears 160b,c lie along the same horizontal plane as shown to simplify the control over the movement of power piston 136.

That portion of drive system 150 which is coupled to power piston 136 is now described. Power journal link 162a may be pivotally coupled at its first end to primary motion gear 160b at pivot point 163, and power journal link 162b may be pivotally coupled at its first end to primary motion gear 160c at pivot point 164. Preferably, power journal links 162a,b are positioned behind gears 160b,c so as to not interfere with other components located ahead of gears 160b,c. Also, it is preferred that a portion of power journal links 162a,b are cut-out so that shafts 161b,c may protrude therethrough to attach gears 160b,c to mounting plate 148.

The pivotal attachments between gears 160b,c and power journal links 162a,b may occur through eccentrics 169 as shown in FIG. 2. To this end, links 162a,b may include circular cut-outs at their first ends into which eccentric 169 may be inserted. Alternatively, a shaft and bearing arrangement may be used. Pivot points 163 and 164 are preferably located at the same distance $R_1$, away from the respective centers of gears 160b,c to simplify control over the motion of power piston 136. $R_1$ which determines the amplitude of the motion of power piston 136 is a function of intended output power.

Power journal links 162a,b preferably extend upwards from pivot points 163, 164 so that their second ends may be pivotally coupled to the ends of translating beam yoke 166 at pivot points 167 and 168 respectively. The length of translating beam yoke 166 between pivot points 167, 168 may be set equal to the distance between the centers of gears 160b,c. The effective length of power journal links 162a,b, i.e., distance from pivot point 163 to pivot point 167 and distance from pivot point 164 to pivot point 168, is preferably the same and preferably permits yoke 166 to clear the radius of gears 160b,c.

It is also preferred that pivot points 163 and 164 be arranged in similar fashion with respect to the centers of their respective gears 160b,c. This is shown in FIG. 2 in that both pivot points 163, 164 are located directly below the centers of the gears 160b,c respectively at the same time during the motion cycle of power piston 136. Translating beam yoke 166 may be coupled to power shaft 156 as shown, and as such, movement of power piston 136 effects movement of yoke 166, links 162a,b and gears 160b,c.

The portion of drive system 150 which is coupled to displacer piston 134 is now described. Short displacer journal link 170a may be pivotally coupled to primary motion gear 160a at pivot point 171 which is at a distance $R_2$ from the center of gear 160a. Long displacer journal link 170b may be pivotally attached to primary motion gear 160c at pivot point 172 which is at a distance $R_3$ from the center of gear 160c. In left side view FIG. 4, the upper portion of long displacer journal link 170b is shown but this link is then broken away as it disappears from view behind short displacer journal link 170a. In right side view FIG. 3, only long link 170b is shown as short link 170a is completely behind long link 170b.

The pivotal attachments between gears 160a,c and links 170a,b may also occur through eccentrics 169 but once again, a shaft and bearing arrangement may be used. As discussed in connection with dwell adjustment however, it is preferred that long displacer journal link 170b be coupled to gear 160c through an eccentric 169 that may provide for adjustment of the orientation of link 170b relative to gear 160c. As shown, displacer journal links 170a,b are preferably located before gears 160a,b so that they do not interfere with power journal links 162a,b upon operation of drive system 150. As also shown, long displacer journal link 170b may include a cut-out along its length to decrease its weight. The other links shown in FIG. 2 may also include similar cut-outs.

Displacer journal links 170a,b preferably extend downwards as shown, and their second ends mays be pivotally coupled to rotating and translating walking beam yoke 174 at pivot points 175 and 176 respectively. Walking beam 174 may be pivotally coupled to displacer shaft 154 at pivot point 178. Pivot point 178 may comprise a shaft and bearing arrangement (not shown). Accordingly, as drive mechanism 150 operates, gears 160a,c and displacer journal links 170 drive walking beam 174, which in turn drives displacer shaft 154 and displacer piston 134. As can be seen, it is the position of pivot point 178 that controls the position of displacer shaft 154 and thus displacer piston 134.

To avoid lateral movement of displacer shaft 154 as drive mechanism 150 operates, linear bearing 180 (not shown in FIGS. 3 and 4) may be used to hold displacer shaft 164 in place. However, linear bearing 180 preferably does not interfere with the reciprocating motion of displacer shaft 154. Walking beam 174 is preferably short within the geometric constraints of drive system 150 so that a reduced amount of torque is applied to displacer shaft 154 from the movement of displacer journal links 170.

The operation of drive system 150 is now described. FIG. 2 shows the phase of displacer piston 134 located about 90 degrees ahead of power piston 136. Power piston 136 is at its bottom dead center position and displacer piston 134 is about halfway between its top and bottom dead center positions. This phase relationship is discussed in more detail later.

In any event, the phase relationship remains constant for those portions of the motion cycle where no dwell occurs. However, walking beam 174 allows displacer piston 134 to remain dwelled at its top and/or bottom dead center positions for a specified amount of time while the sinusoidal motion of power piston 136 remains unaffected. Thus during these dwell periods, the phase relationship between displacer piston 134 and power piston 136 changes.

Reference is now made to FIGS. 5a–5l which depict the motion of displacer shaft 154, power shaft 156, gears 160, power journal links 162, displacer journal links 170 and walking beam 174 as drive mechanism 150 operates through a 360 degree cycle of motion. These figures also show the various pivot points and circles of rotation. FIGS. 5a–5l show the displacer piston 134 leading the power piston 136 by 90 degrees.

In the arrangement shown, displacer shaft 154 (and consequently displacer piston 134) experiences a dwell at both the top and bottom dead center locations. Starting with FIG. 5a, power piston 136 is at its bottom dead center location, i.e., at the end of its power stroke, and displacer piston 134 is about halfway between its top and bottom dead center locations. As drive system 150 continues its cycle through FIGS. 5b and 5c, pivot point 178 between walking beam 174 and displacer shaft 154 generally travels upward because pivot points 171, 172 of displacer links 170a,b provide a net upward movement. Accordingly, displacer piston 134 travels upward thereby nearing its top dead center location. During this portion of the cycle, power piston 136 is moving upward through its compression stroke.

Figure 5:
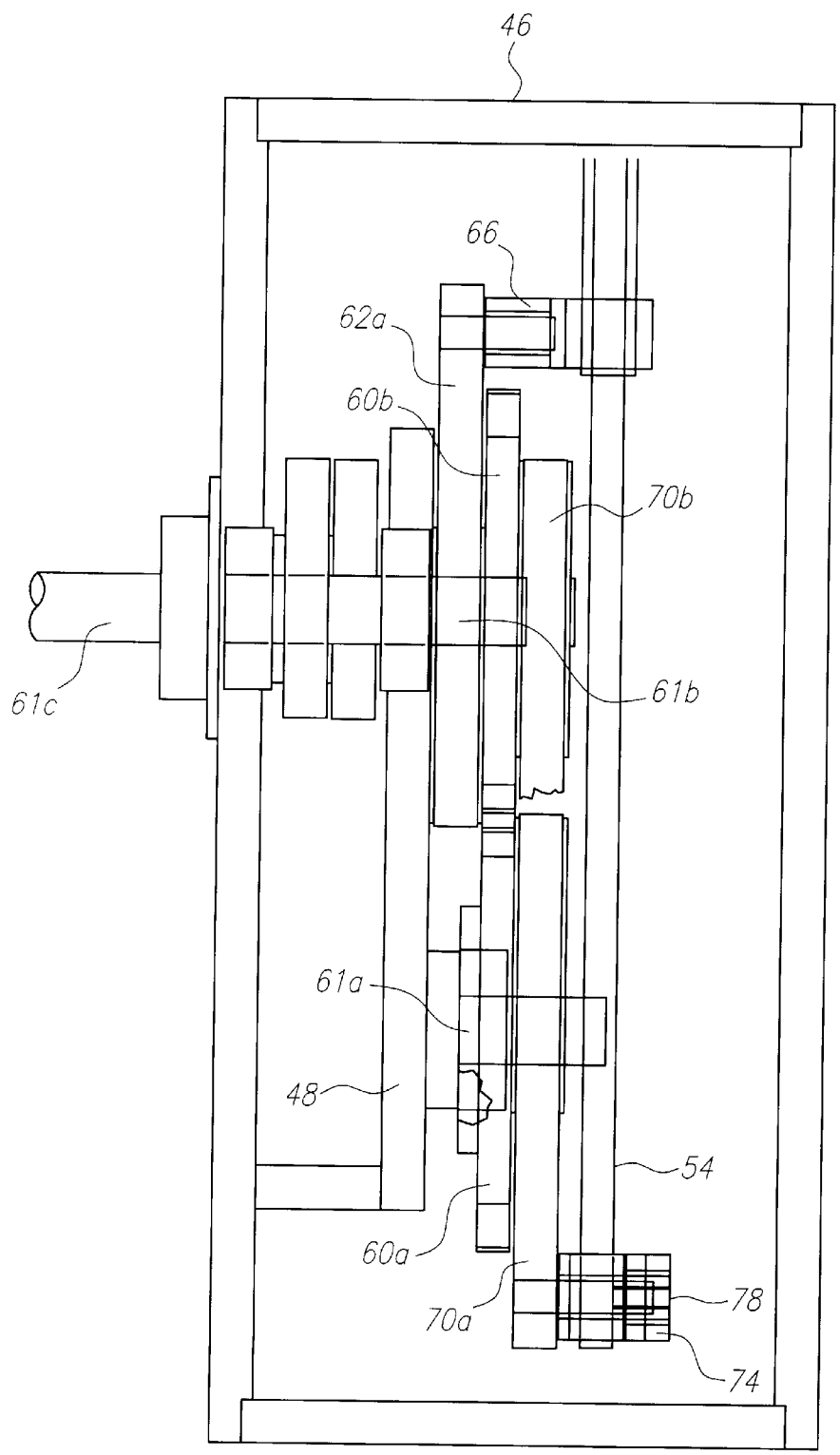
FIGS. 5a–5l are a sequence of figures which show the sequence of operation of a drive system employed in the present invention.

At the portion of the cycle around FIG. 5d, displacer piston 134 is dwelled at its top dead center location. This is essentially because pivot point 178 remains at substantially the same vertical position due to the fact that as short displacer journal link 170a moves down due to the clockwise motion of gear 160a, long displacer journal link 170b moves up due to the clockwise motion of gear 160c. Thus, the respective vertical motions of links 170a,b substantially offset each other and the only motion conveyed to walking beam 174 is substantially one of rotation instead of a net vertical translation. Since this rotation occurs about pivot point 178, displacer shaft 154 and thus displacer piston 134 remains substantially stationary.

During this time, power shaft 156 and thus power piston 136 continue to travel upward on its compression stroke because power journal links 162a,b do not offset each other but instead are both undergoing upward vertical motion due to the counterclockwise and clockwise rotation of gears 160b,c respectively. Thus the phase relationship between displacer piston 134 and power piston 136 changes during this time.

After displacer piston 134 has dwelled at its top dead center location, and as the cycle proceeds through FIGS. 5e–5i, both displacer journal links 170a,b generally travel downward. Walking beam 174 and thus displacer shaft 154 and displacer piston 134 also travel downward. During this time, power piston 136 continues towards its top dead center which location is reached in FIG. 5g, and then begins its power stroke. Also during this time, the phase between displacer piston 134 and power piston 136 generally remains the same.

At the portion of the cycle around 5j, displacer piston 134 is dwelled at its bottom dead center location. This is essentially because pivot point 178 remains at substantially the same vertical position due to the fact that as short displacer journal link 170a moves up due to the clockwise motion of gear 160a, long displacer journal link 170b moves down due to the clockwise motion of gear 160c. Thus again, the respective vertical motions of links 170a,b substantially offset each other and the only motion conveyed to walking beam 174 is substantially one of rotation instead of a net vertical translation. Displacer shaft 154, and thus displacer piston 134 remain substantially stationary.

As this dwell occurs, power piston 136 continues its power stroke (both power journal links 162a,b continue travelling downward). Accordingly a change in phase again occurs. Because the displacer piston remains at its bottom dead center location however, the force provided by the expanding hot gas in cold space 144 is exerted more acutely on power piston 136, and is less "consumed" by the expansion of cold space 144 (not shown in FIGS. 5a–5l). Accordingly, the power stroke does more work and the Stirling engine 130 outputs more power.

After the dwell occurring at bottom dead center, and as the cycle continues on in FIGS. 5k–5d, both displacer journal links 170a,b travel upward and displacer piston 134 again travels towards its top dead center position as indicated in FIG. 5d. During this time, the phase between displacer piston 134 and power piston 136 again remains the same.

Figure 6A:
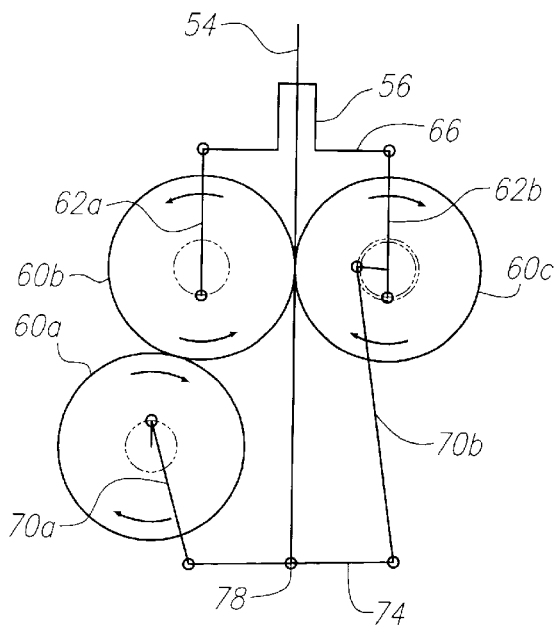
FIG. 6a graphically shows the amplitude of the movement of a displacer piston employed in the present invention.
Figure 6B:
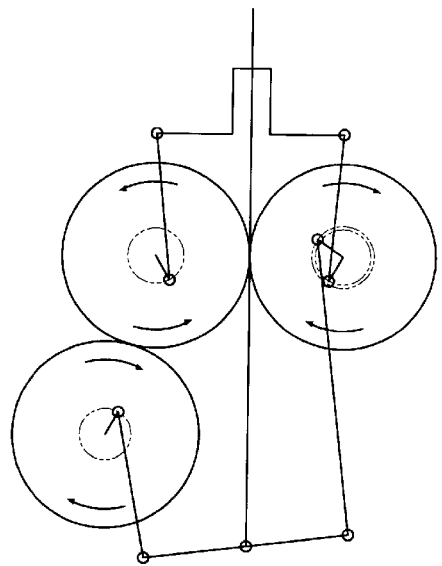
FIG. 6b graphically shows the amplitude of the movement of a power piston employed in the present invention.
Figure 6C:
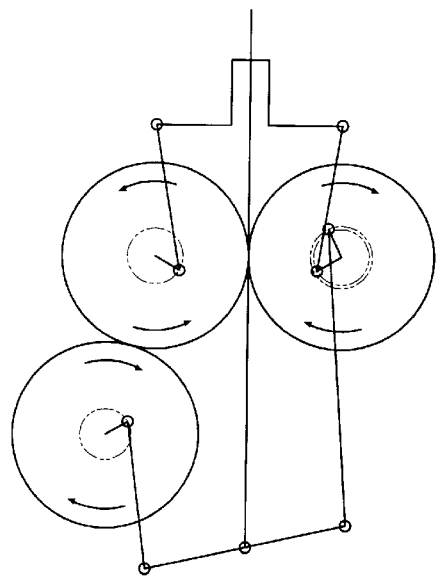
Figure 6D:
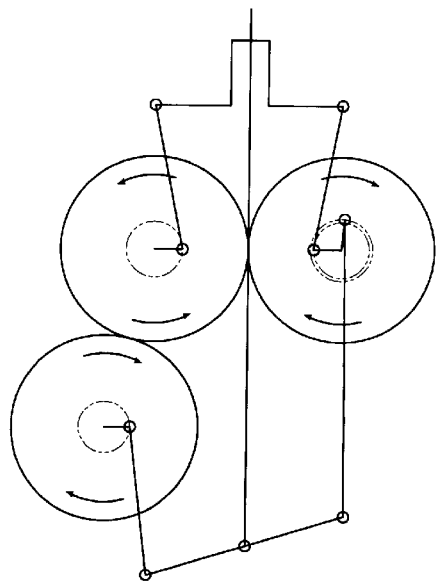
Figure 6E:
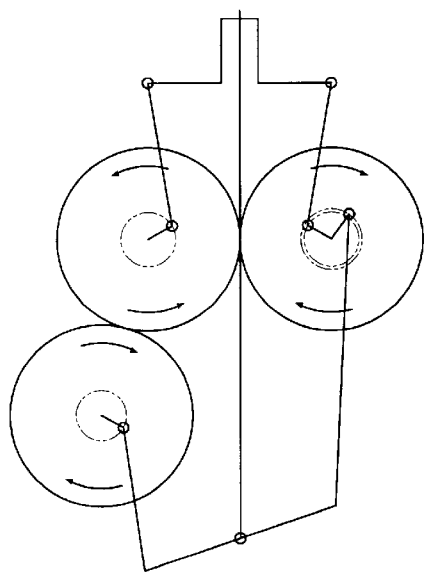
Figure 6F:
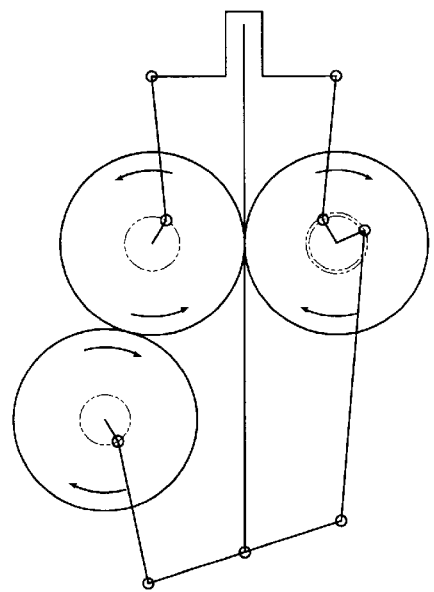
Figure 6G:
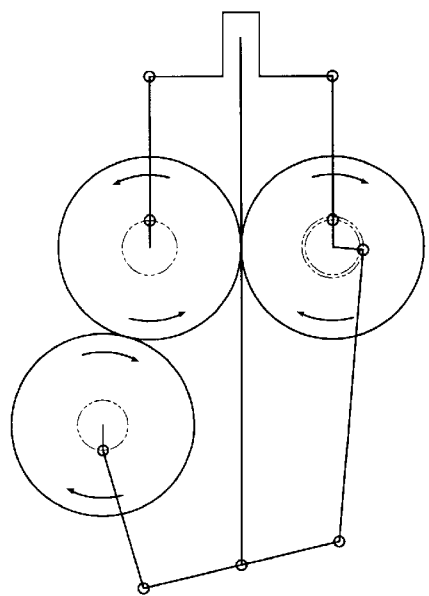
Figure 6H:
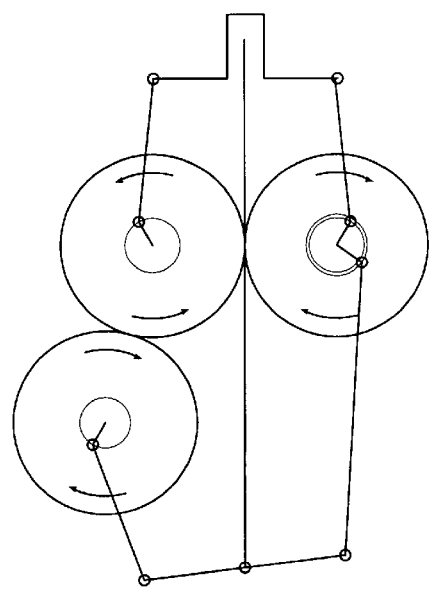
Figure 6I:
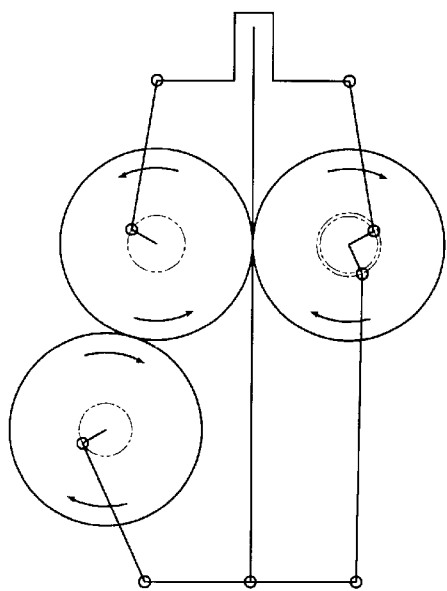
Figure 6J:
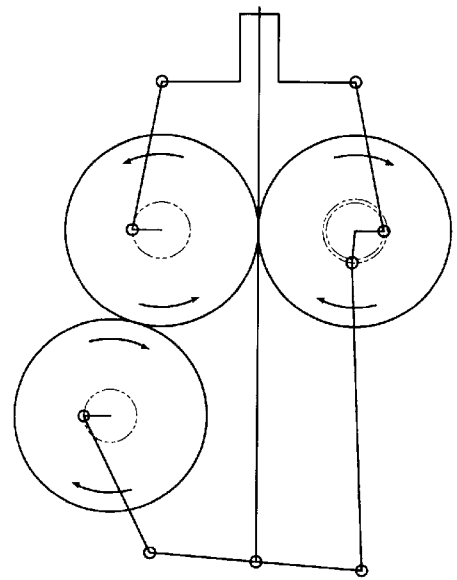
Figure 6K:
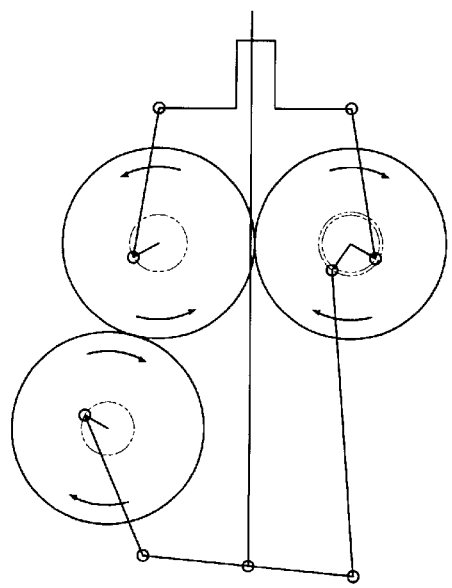
Figure 6L:
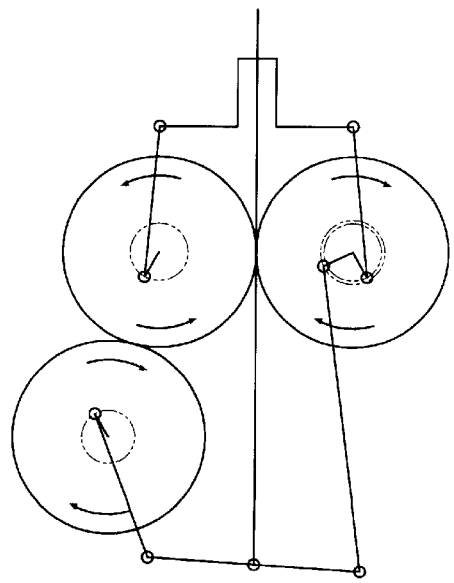

Graphical representations of the amplitudes of displacer piston 134 and power piston 136 at thirty degree intervals are shown in FIGS. 6a and 6b respectively. As shown, the phase of displacer piston 134 leads power piston 136 by 90 degrees. The dwell of displacer piston 134 is represented by the flat portions occurring at the amplitude maxima and minima portions of the curve.

Referring to FIG. 7, the geometrical relationships between the various components discussed above and which are responsible for producing the dwell of the current invention are now discussed. FIG. 7 shows displacer links 170a,b and walking beam 174 at two positions during the cycle of operation of drive system 150. The solid lines indicates the point where power piston 134 is at its bottom dead center location and displacer piston is 90 degrees ahead of power piston 134 and is travelling upwards to its top dead center location. This is the configuration shown in FIGS. 2 and 5a. The broken lines show these components at 180 degrees ($\pi$ radians) later in the cycle.

The dwell of displacer piston 134 is generally related to the respective amplitudes of the motions of power piston 136 and displacer piston 134. The amplitude of power piston 136 motion is equal to twice the rotational radius $R_1$, i.e., twice the distance between the centers of primary motion gears 160b,c and pivot points 163, 164 respectively. This distance is $D_1$ in FIG. 7, i.e., twice the distance of $R_1$, and the circle of rotation having a diameter $D_1$ is shown. As indicated above, it is preferred that power journal links 162a,b be coupled to their respective gears 160b,c in similar fashion. This is because the amplitude of power piston 136 is thereby more easily controlled.

The amplitude and motion characteristics of displacer piston 134 are generally more complex and depend on factors including the following: (1) the distance $R_2$ and $R_3$ as shown in FIG. 2, (2) the center-to-center distance between primary motion gears 160a,b,c, (3) the length of displacer journal links 170a,b and (4) the relationship between the pivot points at either end of walking beam yoke 174, and pivot point 178.

Because pivot points 171, 172 of displacer journal links 170a,b are located at different off-center locations relative to each other on gears 160a,c respectively, displacer journal links 170a,b move in a synchronous fashion. To this end, it should be noted that the pivot point 171 of short displacer journal link 170a is located a distance $R_2$ away from the center of gear 160a, which is shorter than the distance $R_3$ between pivot point 172 of long displacer journal link 170b and the center of gear 160c. Thus the circle of rotation of pivot point 171 having a diameter $D_2$ is smaller than the circle of rotation of pivot point 172 having a diameter $D_3$. These circles of rotation are shown in FIG. 7.

The aforesaid a synchronous motion of displacer journal links 170a,b provides for control and manipulation of relative dwell, duration of dwell, location and stroke amplitude of displacer piston 134. The a synchronous motion of displacer journal links 170a,b also serves to change the phase angle φ between displacer piston 134 and power piston 136 during the dwell portions of the cycle of drive system 150.

One relationship with respect to the foregoing parameters is tied to the sine of the phase angle φ between displacer piston 134 and power piston 136. Assuming that $D_3$ and $D_2$ are the larger and smaller circles of rotation of displacer journal links 170*a,b* as defined in FIG. 7, the empirical relationship between the various variables to the amplitude of displacer piston 134 is of the following nature:

$$[(A^*D_3^*\sin(\phi)+B^*D_2^*\sin(\phi))^*0.5]+C^*D_2\sin(\phi)=\text{amplitude of Displacer Piston}$$

In this relationship, A, B and C are scalar constants that may be determined analytically or experimentally and the angle Θ is the angle between the longitudinal axis of walking beam 174 and horizontal. In view of the foregoing relationship, the relative diameters ($D_3$ and $D_2$) may be varied to optimize the performance of Stirling engine 130, as may be the phase angle φ between displacer piston 134 and power piston. In any event, the following relationships may be written.

$$[(A^*D_3^*\sin(\phi)+B^*D_2^*\sin(\phi))^*0.5]+C^*D_2\sin(\phi)=\text{amplitude of Displacer Piston}$$

$$[(A^*D_3+B^*D_2)^*\sin(\phi)^*0.5]+C^*D_2\sin(\phi)=\text{amplitude of Displacer Piston}$$

If the angle θ, i.e., the angle between the longitudinal axis of walking beam 174 and a horizontal line, is zero, the following relationship may apply:

$$(D_3^*0.5+D_2^*0.5)^*\sin(\phi)=\text{amplitude of Displacer Piston}$$

Or, in this case of drive system 150 shown in FIG. 2, $$(D_3^*0.5+D_2^*0.5)^*\sin(\phi)=1.4$$

The above relationship may be rewritten as follows.

$$(D_3+D_2)^*\sin(\phi)=2.8,$$

where φ ranges from 75° to 90°

Thus it is seen that the system is described by an equation with three. variables and a target amplitude. The system equation may be solved mechanically, iteratively or graphically. Doing so results in a functional representation of drive system 150 as shown in the sequence of FIGS. 5*a* through 5*l* discussed above.

Figure 8:
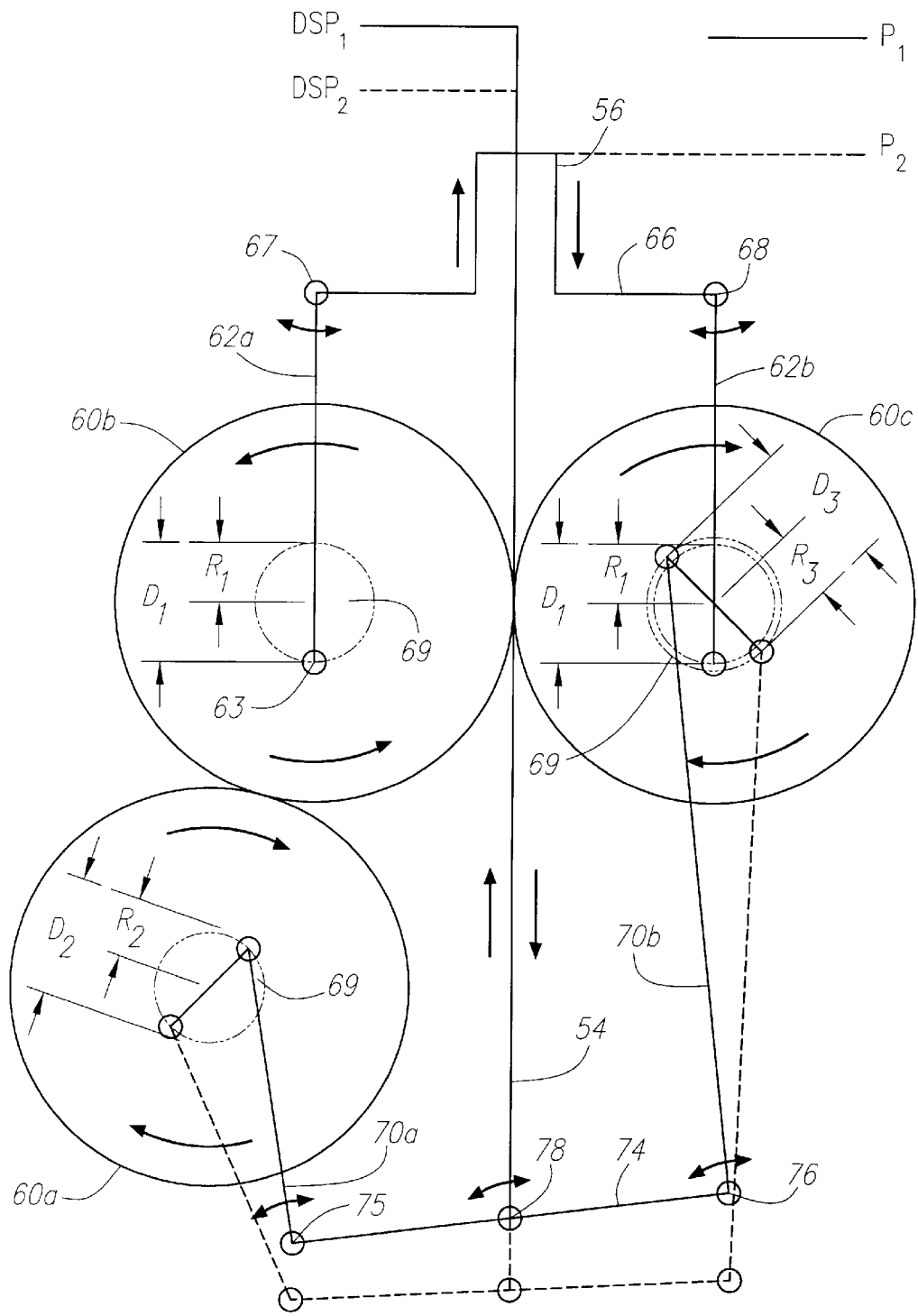
FIG. 8 illustrates an overall system for a Stirling engine employed in the system of the present invention.

Now that the operation of drive system 150 has been described, the overall operation of Stirling engine 130 is discussed with reference to FIG. 8. As shown, starter motor 190, water pump 192 and flywheel 194 may be rotatably mounted to frame 146 by suitable shafts (not shown). It should be noted that FIG. 8 shows the pullies associated with starter motor 190 and water pump 192 that drive these components. Flywheel 194 however, is preferably coupled to power output shaft 161*c* and is thus coupled to gear 160*c*. Starter motor 190, cooling pump 192 and flywheel 194 preferably communicate with each other via belt 196.

When starting Stirling engine 130, heater 198 is activated to heat the working fluid or gas. In FIG. 8, heater 198 is partially broken away to show working fluid control loop 138 and heat exchanger/cooler 140. Starter motor 190 may then be activated which serves to rotate cooling pump 192 and flywheel 194. Cooling pump 192 pumps a cooling fluid to cooler 140 to cool the working fluid or gas as it enters cold (compression) space 144 between displacer piston 134 and power piston 136. In an automotive application, cooling pump 192 may pump a cooling fluid through the radiator of the vehicle, which cooled fluid is then passed to the cooler 140.

The rotation of flywheel 194 rotates gear 160*c* which in turn rotates gear 160*b* and 160*a*. Rotation of gears 160*a,b,c* ultimately starts the operation of the entire drive system 150 and thus starts the Stirling cycle of engine 130. That is, power beam yoke 166 and walking beam 174 move in response to the rotation of gears 160 which in turn reciprocates power piston 136 and displacer piston 134 respectively. As this occurs, the working fluid or gas begins to be alternatingly transmitted between hot end 142 and cold end 144 through control loop 138. The consequent expansion and contraction of the working fluid or gas then provides the force necessary to perpetuate the cycle of drive mechanism 150.

As drive mechanism 150 operates, the power produced thereby is transmitted through power output shaft 161*c* which may then provide power as necessary. For example, output power shaft 161*c* may be coupled to an automobile axle or transmission. And because displacer piston 134 is dwelled as described above, this power output is increased over existing Stirling engines.

Adjustment of the dwell of displacer piston 134 is now discussed with reference to FIGS. 9*a*–9*f*. As shown, dwell adjustment generally occurs by varying the angles of orientation of displacer journal links 170*a,b* in relation to their respective centers of gears 160*a,c*.

Figure 9:
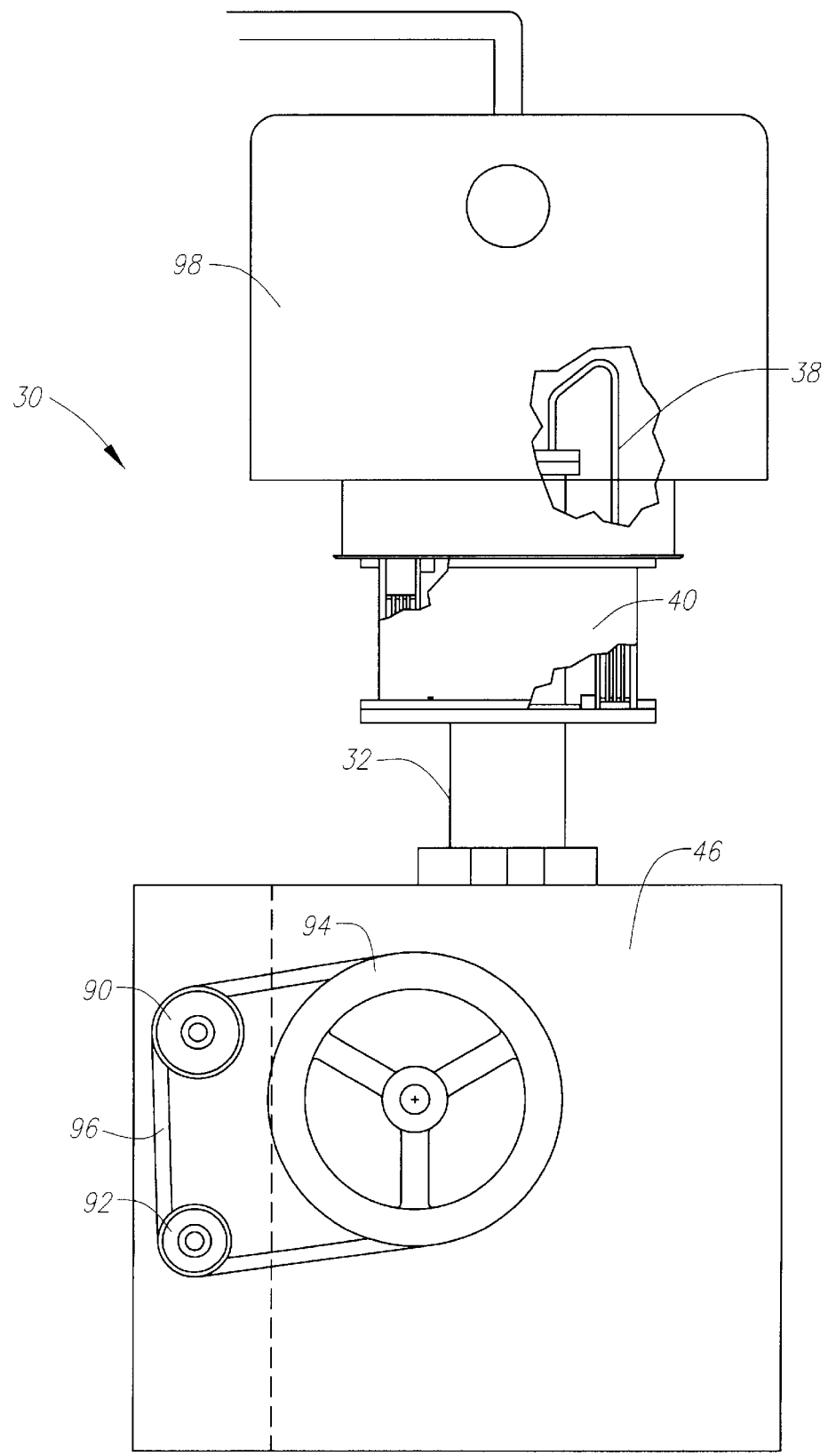
FIGS. 9a, c and e show varying configurations of a drive system to vary the dwell of a displacer piston employed in the system of the present invention.
FIGS. 9b, d and f graphically show the relative amounts of dwell occurring at top and bottom dead center as a result of the configurations shown in FIGS. 9a, c and e, respectively.
Figure 10A:
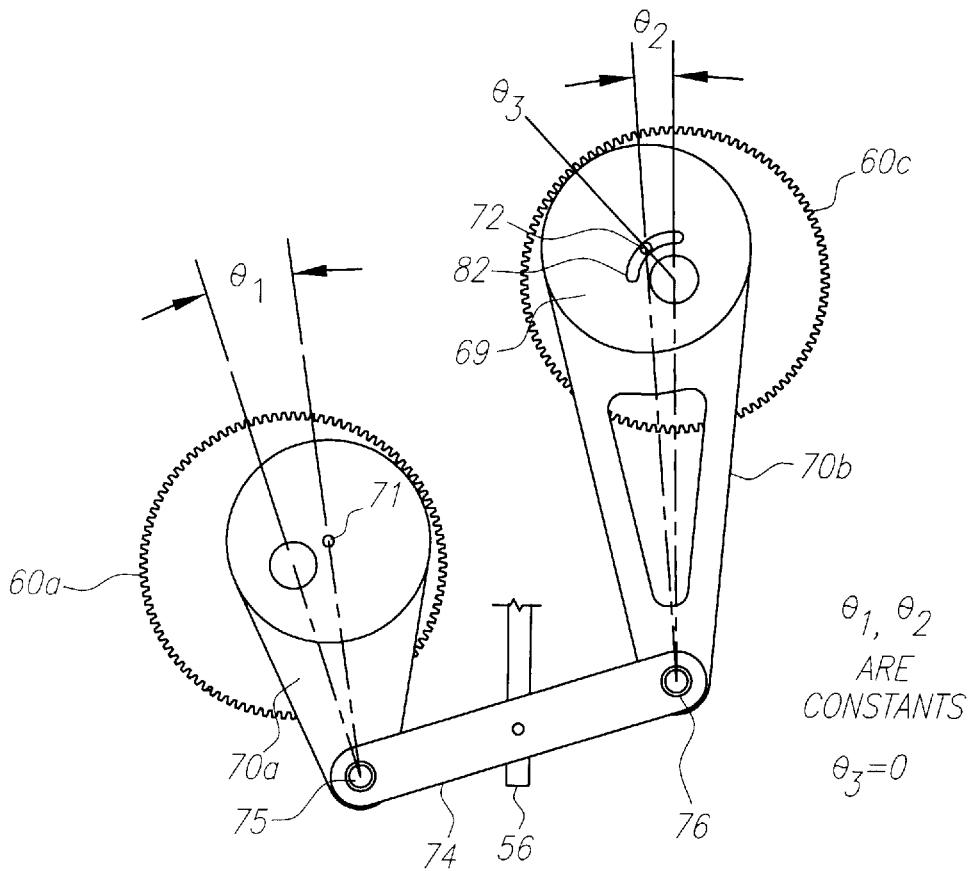
FIG. 10 shows a drive system for use in an Alpha configuration Stirling engine.
Figure 10B:
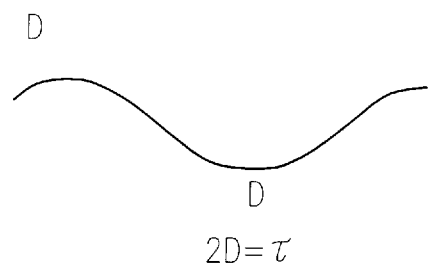
Figure 10C:
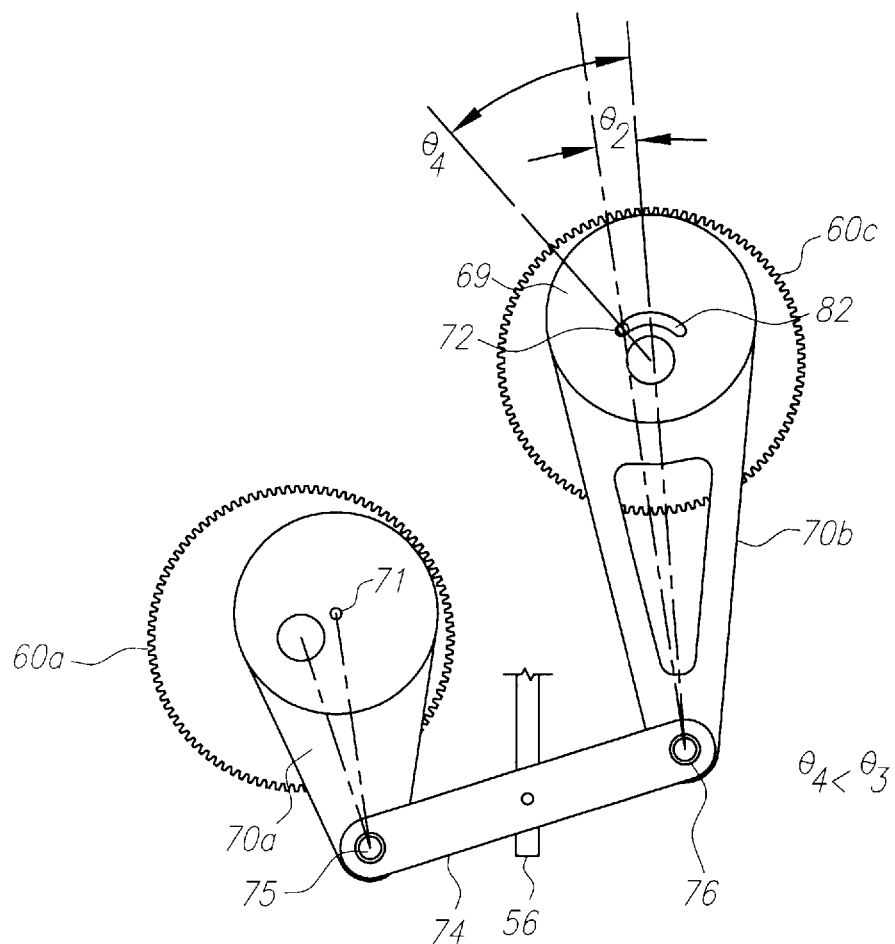
Figure 10D:
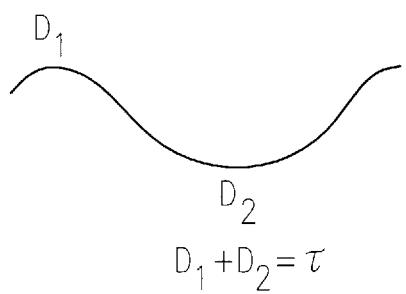
Figure 10E:
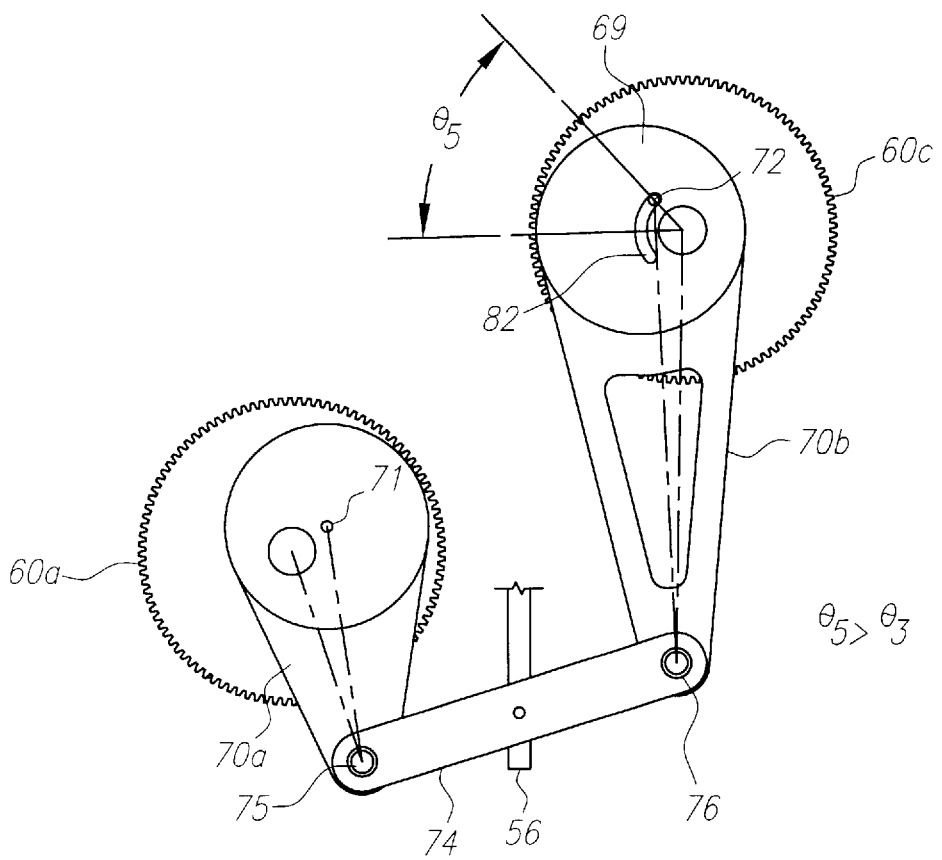
Figure 10F:
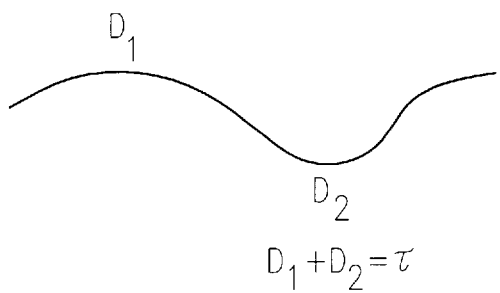

In FIG. 9*a*, short displacer journal link 170*a* is oriented at an angle $\Theta_1$. As shown, $\Theta_1$ is the angle formed by the distance between the center of gear 160*a* and pivot point 171 in relation to pivot point 175. Long displacer journal link 170*b* is oriented at an angle $\Theta_2$ formed by the distance between pivot point 172 and the center of gear 160*c* in relation to pivot point 176. $\Theta_3$, which serves as a reference point, is zero degrees.

In this configuration, which is similar to that shown in FIG. 2, an equal amount of dwell D occurs at the top and bottom dead center locations of displacer piston 134 as graphically shown in FIG. 9*b*. The dwell D occurring at each location is about 37 degrees, and the cumulative dwell T occurring at top and bottom dead centers, which is the total amount of dwell provided by drive system 150, is thus about 74 degrees.

In FIG. 9*c*, the position of long displacer link 170*b* has been changed by positioning it at one end of cut-out 182 such that it is oriented at an angle $\Theta_4$ which is smaller than, i.e., negative with relation to, $\Theta_3$. The orientation of short displacer link 170*a* has remained the same. Where displacer link 170*b* is oriented at $\Theta_4$, the amount of dwell $D_2$ occurring at the bottom dead center location of displacer piston 134 motion is increased while the amount of dwell $D_1$ occurring at the top dead center location of displacer piston 134 motion is decreased as graphically shown in FIG. 9*d*. The total amount of dwell T cumulatively provided at top and bottom dead centers remains the same, however.

Increasing the dwell at the bottom dead center location of displacer piston 134 is advantageous in that the force provided by the hot expanding gas entering cold space 144 is exerted against power piston 136 during its power stroke is increased. That is, less force is "consumed" by the expansion of cold space 144 and the force is exerted against power piston 136 for a longer period time thereby increasing the power output of Stirling engine 130.

Another advantage of increasing the dwell at the bottom dead center location is related to the relative efficiencies of the heating and cooling mechanisms of control loop 138. That is, where the heating mechanism may not be as efficient as the cooling mechanism, more time to heat the working fluid as it enters hot end 142 of cylinder 132 may be necessary. Accordingly, providing more dwell at bottom dead center provides more time for sufficient heating to occur because a longer amount of time will be required for displacer piston 134 to return back to top dead center at hot end 142. While it might appear that most or all of the dwell provided by drive system 150 should occur at bottom dead center, the maximum allowable amount of dwell occurring at bottom dead center may be restricted in view of the dimensional and geometrical constraints posed by the various component of drive system 150.

In FIG. 9e, the position of long displacer link 170b has been changed to the other end of cut-out 182 such that it is oriented at an angle $\Theta_5$ which is larger than, i.e., positive with relation to, $\Theta_3$. The orientation of short displacer link 170a has remained the same. Where displacer link 170b is oriented at $\Theta_5$, the amount of dwell $D_2$ occurring at the bottom dead center location of displacer piston 134 motion is decreased while the amount of dwell $D_1$ occurring at the top dead center location of displacer piston 134 motion is increased as graphically shown in FIG. 9d. The total amount of dwell T cumulatively provided at top and bottom dead center locations again remains the same. It may be advantageous to increase the dwell at the top dead center location where the cooling mechanism of Stirling engine 130 is less efficient than the heating mechanism. In this manner, more time is provided for the working fluid or gas to cool after entering cold space 144 of cylinder 132 because displacer piston 134 will require more time to return to cold end 144.

To change its orientation, long displacer journal link 170b may include a circular cutout at its upper end that may accommodate a correspondingly circular eccentric 169. The eccentric is in turn attached to gear 160c. The eccentric may include an arcuate cutout 182, the arc of which preferably does not match the arc of the perimeter of gear 160c. Arcuate cutout 182 may accommodate a pin extending outward from gear 160c. By rotating eccentric 169 along arc 182, the effective orientation of long displacer journal link 170b is changed, thereby changing the angle and the associated dwell occurring at the top and bottom dead center locations.

The dwell of displacer piston 134 may also be varied by changing the orientation of short displacer journal link 170a while leaving the orientation of long displacer journal link 170b the same. Furthermore, the total amount of dwell time T may be varied by changing the orientation of both displacer links.

The setting and adjustment of the phase angle $\phi$ between displacer piston 134 and power piston 136 is now described with reference to FIG. 7. The phase angle $\phi$ between displacer piston 134 and power piston 136 is generally a function of the relationship between gears 160. If eccentrics 169 are used in cut-outs of the various links 162, 170, the position of eccentrics 169 also affects the phase angle $\phi$. Thus the phase angle $\phi$ may generally be changed by simply rotating one of gears 160 relative to another thereby changing which teeth are intermeshed.

To arrive at a phase angle $\phi$ where displacer piston 134 leads power piston by 90 degrees, the top and bottom points of the cycle of power piston 136 may be determined by rotating gears 160b,c through one revolution of travel. Alternatively, power piston 136 amplitude is generally equal to twice the distance between the centers of gears 160b,c to the respective pivot points 163, 164. The top and bottom points of power piston 136 are shown graphically on FIG. 7 as $P_1$ and $P_2$ respectively.

The top and bottom points of the cycle of displacer piston 134 may then be determined by rotating gears 160a,b,c through a revolution of travel, which points are graphically shown as $DSP_1$ and $DSP_2$ respectively. Alternatively, because the lengths of displacer links 170a,b and walking beam 174 are constant, the amplitude may be determined as discussed earlier. After these amplitudes have been determined, to set the phase of displacer piston 134 ahead of the phase of power piston 136 by 90 degrees, gears 160 may be adjusted relative to each other, or eccentrics 169 may be adjusted, so that the midpoint between the $DSP_1$ and $DSP_2$ locations is at the top point of power piston 136 travel, i.e., point P1.

It is preferred that any such phase angle $\phi$ change be effected between gears 160a,b. This is because these gears are associated with only one of the displacer and power link journals while gear 160c is associated with both. Such adjustments may also generally vary the stroke of displacer piston 134.

Figure 11:
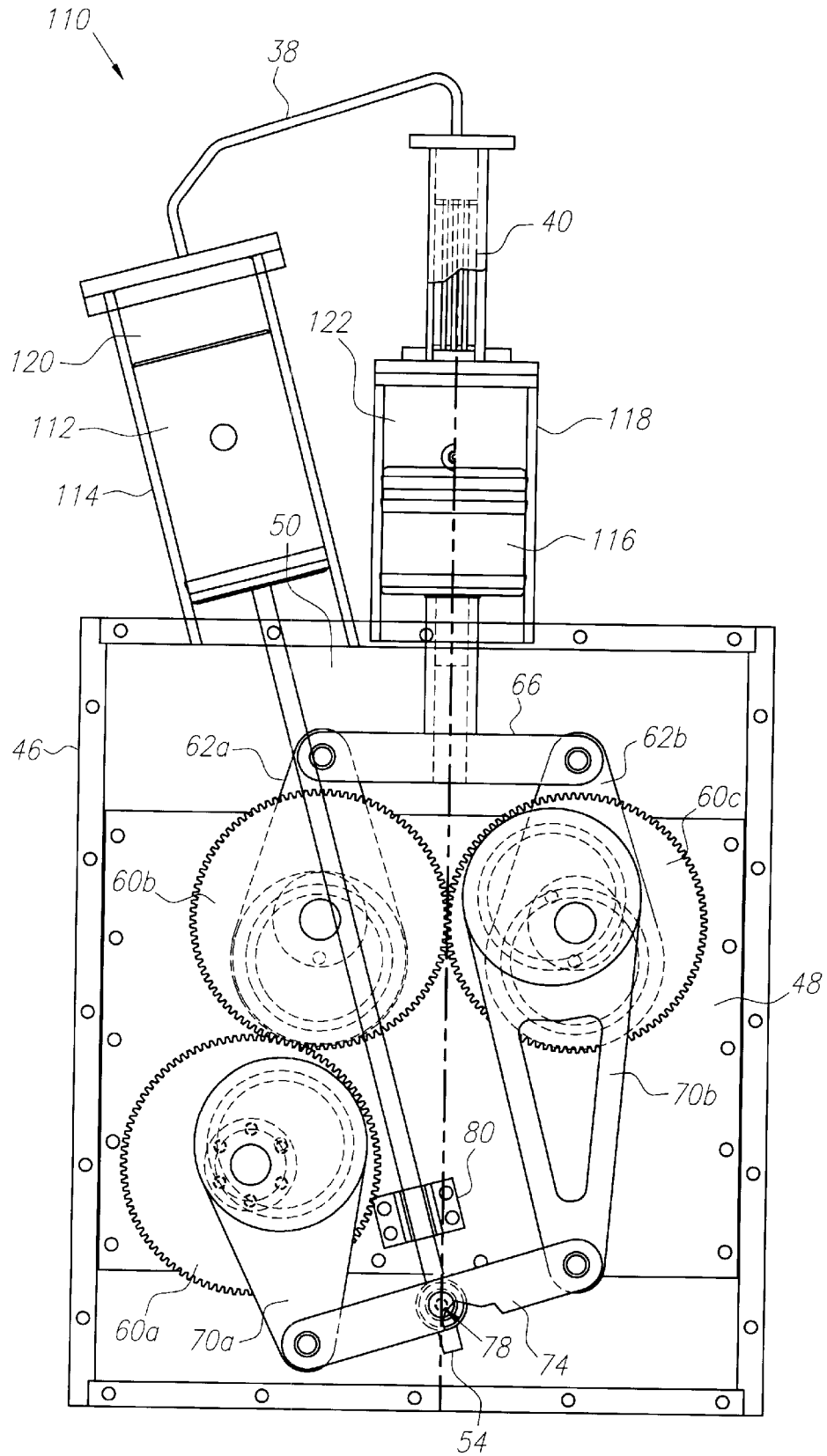
FIG. 11 shows a drive system for use in a Gamma configuration Stirling engine.

Referring now to FIGS. 10 and 11, drive system 150 is shown in connection with Alpha and Gamma configuration Stirling engines, respectively. In FIG. 10, Alpha configured Stirling engine 210 may include components similar to those of drive system 150 shown in FIG. 2, which components are referenced by similar numerals.

The primary difference between Alpha Stirling engine 210 and Beta Stirling engine 130 is that the displacer and power pistons are not housed by the same cylinder. Instead, displacer piston 212. is housed in cylinder 214 and power piston 216 is housed in cylinder 218. Cylinder 212 includes cold space 220 and cylinder 218 includes hot space 222. To accommodate the cylinders 212, 218, displacer shaft 154 extends at an angle from walking beam 174 to displacer piston 134. Linear bearing 180 is thus coupled to mounting plate 148 at the location shown to accommodate this angle.

In Alpha Stirling engine 210, it is generally the case that the stroke of displacer piston 212 is longer than the stroke of displacer piston 134 in Beta Stirling engine 130. This is generally because there is typically a longer distance over which the working fluid or gas must travel when alternating between hot space 222 and cold space 220.

Referring to FIG. 11, Gamma configured Stirling engine 230 is shown where like elements are similarly numbered. Here, displacer piston 232 is housed by displacer cylinder 234 and power piston 236 is housed by power cylinder 238. Cylinder 232 includes cold space 240 and hot space 242. To accommodate cylinders 234, 238, displacer shaft 154 may again extend at an angle, and linear bearing 180 is mounted to mounted plate 148 accordingly.

Figure 12:
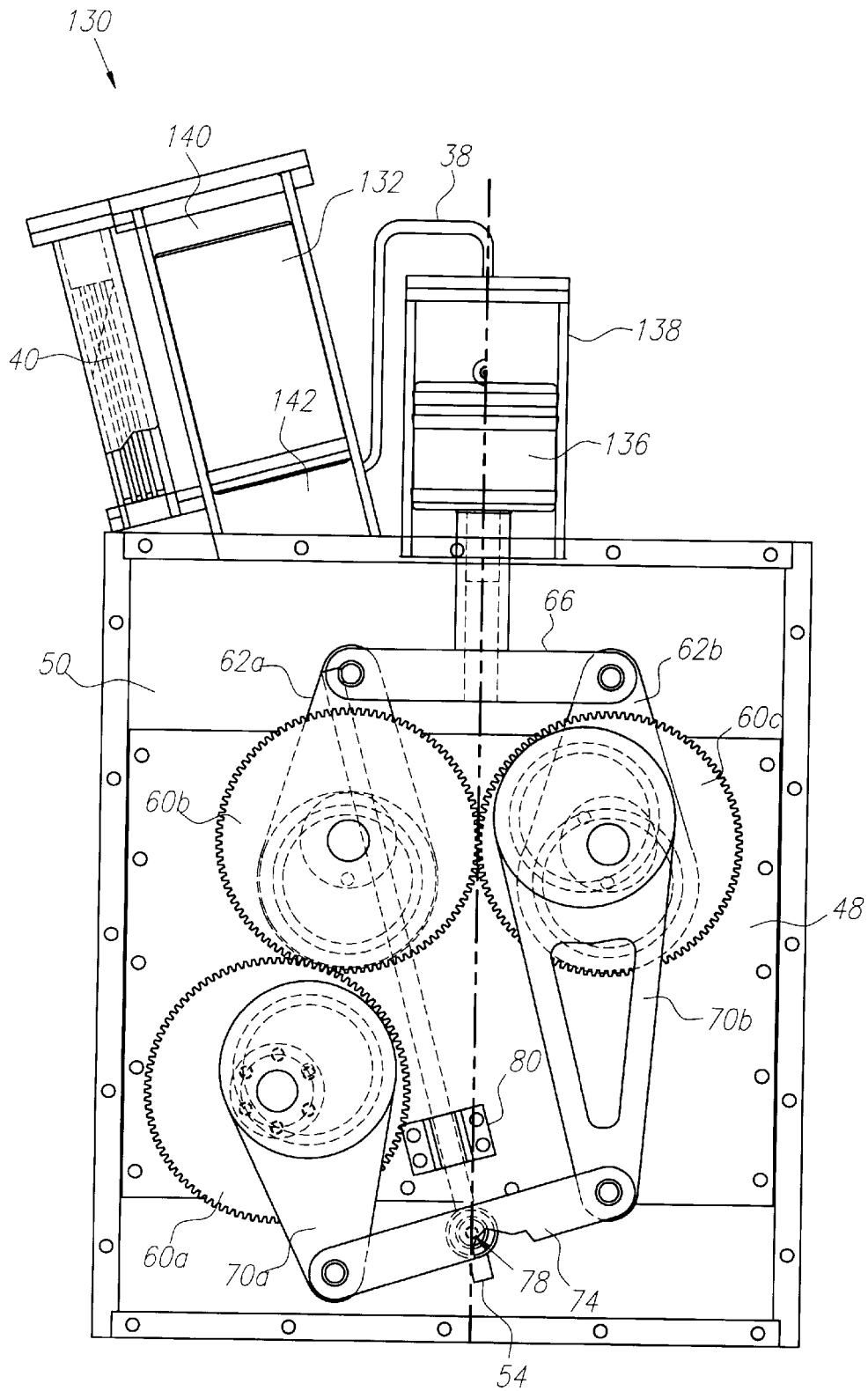
FIG. 12 shows an alternate drive system in a Beta configuration Stirling engine.

Referring to FIG. 12, an alternate configuration of drive system 150 is shown in connection with a Beta configured Stirling engine 248. Like components are similarly numbered as those in previous embodiments. The primary difference between drive system 250 and drive system 150 of Beta Stirling engine 130 in figure. 2 is that gears 160 are aligned on the same horizonal plane. Furthermore, displacer link journals 170 may be the same length. In this embodiment, displacer arm 252 is fixedly attached to displacer shaft 154 as shown. Displacer arm 252 extends toward walking beam 254 and is pivotally coupled thereto at pivot point 256. Accordingly, the dwell at top and/or dead bottom centers occurs as walking beam 254 rotates about pivot point 256.

To avoid lateral movement of displacer shaft 154, linear bearing 258 may be installed near the end of displacer shaft 154. Linear bearing 258 allows reciprocating movement of displacer shaft 154. Dwell and phase angle may be adjusted in similar manner as described above.

Various changes and modifications may be made in carrying out the present invention without departing from the spirit and scope thereof. Insofar as these changes and modifications are within the purview of the appended claims, they are to be considered as part of the present invention.

I claim:

1. A power system for extending the effective range of an electric vehicle, said system comprising: a Stirling engine including a displacer piston and a power piston and comprising a drive system coupling the displacer piston and power piston, the drive system having a floating yoke member coupled to the displacer piston, the yoke configured to provide a dwell at both top dead center and bottom dead center in a stroke of the displacer piston; a non-polluting heat source communicating with said engine for powering said engine; a generator of electricity mechanically coupled to said engine; an electric motor for driving the vehicle; a battery power supply electrically coupled to said motor; and a control assembly electrically coupled to said generator, said battery power supply and said motor for selectively coupling said generator with said motor for driving said motor, said battery power supply with said motor for providing additional power to drive said motor, and said generator with said battery power supply for recharging said supply.

2. The combination of claim 1 wherein said control assembly couples said generator with said battery power supply subsequent to coupling said supply with said motor whereby said supply is recharged after being drained by the coupling of said supply with said motor.

3. The combination of claim 1 wherein said control assembly intermittently couples said generator with said battery power supply while said generator is continuously coupled with said motor for driving said motor whereby said battery power supply can be maintained in a charged disposition.

4. A power system for extending the effective range of an electric vehicle, said system comprising: a Stirling engine including a displacer piston, a power piston, and a drive system including linkages for coupling the displacer piston and power piston, the drive system providing a dwell in a stroke of the displacer piston, wherein the linkages are adjustable to vary the total amount of dwell provided; a non-polluting heat source communicating with said engine for powering said engine; a generator of electricity mechanically coupled to said engine; an electric motor for driving the vehicle, a battery power supply electrically coupled to said motor; and a control assembly electrically coupled to said generator, said battery power supply and said motor for selectively coupling said generator with said motor for driving said motor, said battery power supply with said motor for providing additional power to drive said motor, and said generator with said battery power supply for recharging said supply.

5. A power system for extending the effective range of an electric vehicle, said system comprising: a Stirling engine including a displacer piston and a power piston and comprising a drive system coupling the displacer piston and power piston, the drive system having a floating yoke member coupled to the displacer piston, the yoke configured to provide a dwell at both top dead center and bottom dead center in a stroke of the displacer piston; a device mechanically coupled to said engine for converting said mechanical energy into electrical energy; an electric motor for driving the vehicle; a battery power supply electrically coupled to said motor; and a control assembly electrically coupled to said generator, said battery power supply and said motor for selectively coupling said generator with said motor for driving said motor, said battery power supply with said motor for providing additional power to drive said motor, and said generator with said battery power supply for recharging said supply.

6. A power system for extending the effective range of an electric vehicle, said system comprising: a Stirling engine including a displacer piston, a power piston, and a drive system including linkages for coupling the displacer piston and power piston, the drive system providing a dwell in a stroke of the displacer piston, wherein the linkages are adjustable to vary the total amount of dwell provided; a device mechanically coupled to said engine for converting said mechanical energy into electrical energy; an electric motor for driving the vehicle; a battery power supply electrically coupled to said motor; and a control assembly electrically coupled to said generator, said battery power supply and said motor for selectively coupling said generator with said motor for driving said motor, said battery power supply with said motor for providing additional power to drive said motor, and said generator with said battery power supply for recharging said supply.

* * * * *